UNITED STATES PATENT OFFICE.

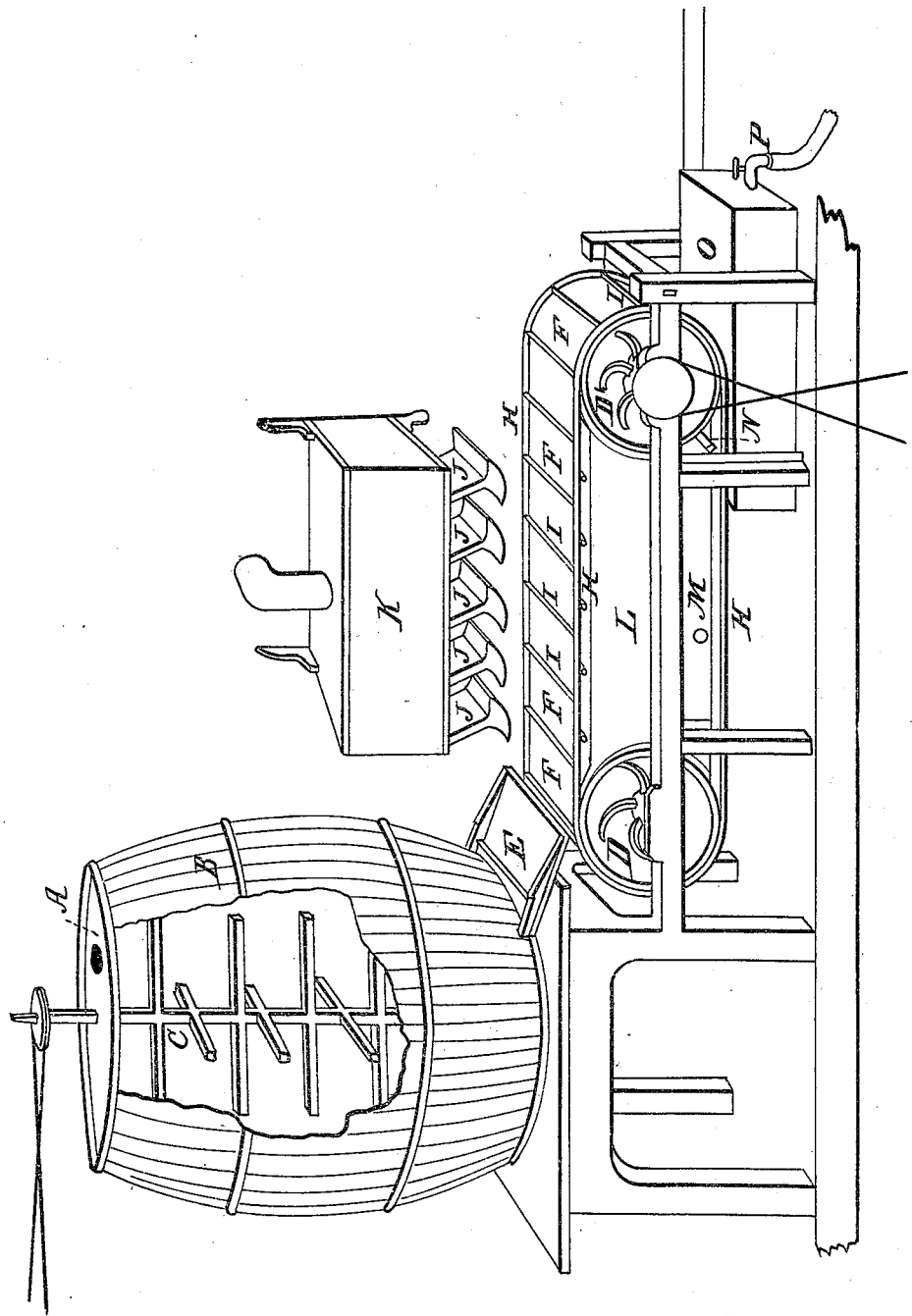

SAMUEL LENHER AND HALLAM H. SPENCER, OF PHILADELPHIA, PA.

IMPROVED APPARATUS FOR WASHING PAPER-STUFF.

Specification forming part of Letters Patent No. 46,915, dated March 21, 1865.

*To all whom it may concern:*

Be it known that we, SAMUEL LENHER and HALLAM H. SPENCER, of the city and county of Philadelphia, and State of Pennsylvania, have invented a new and improved mode of washing stuff to be used for the manufacture of paper, whether the same be produced from refuse newspapers and waste paper or from the comminution of rags or other fibrous substances; and we hereby declare that the following is a full and exact description thereof, reference being had to the accompanying drawings, and to the letters of reference marked thereon.

We are aware that Letters Patent were granted on the 23d day of July, 1861, to one Benjamin Lambert for a process of boiling printed paper in a closed vessel containing a weak caustic alkali repeatedly. This we do not claim.

The nature of our invention is as follows: A strong solution of caustic soda or lime is made, in the proportion of from three to five pounds of caustic soda to ten gallons of water. The papers and printed matter are thoroughly soaked and saturated in the same, and are then, when cooled, thoroughly macerated and comminuted therein.

Our claim is for the process of washing the stuff produced by this operation. The stuff is caused to flow upon a sieve of the finest wire gauze or muslin, with very minute meshes, and subjected to the force of many minute jets of clean water issuing from a rose or other distributor of water, whereby the coloring matter and carbonaceous particles of ink, dust, and other fine impurities are driven through the sieve and carried off with the waste water, and the pulp is thoroughly cleansed.

To enable others skilled in the art to make and use our invention, we proceed to describe its construction and mode of operation.

The waste paper is well saturated in the above-mentioned solution, and is then macerated and comminuted by beating in an ordinary rag-engine. The solution of caustic soda is then expressed, and may be revivified by the addition of lime and again made use of. The stuff produced by this operation we place, together with water, in the circular stuff-tub B, where it is kept in constant agitation by the rotating dasher C. Through the slit E the stuff flows onto the sieves. The sieves F F F are constructed of an endless band of the finest wire-gauze, (No. 100 is preferred by us,) surrounded by sides of thick india-rubber shirred goods about three inches high, and divided into separate compartments or sieves by wooden partitions I I I, of the same height, fastened to the wire and sides by screws. The endless band passes around two drums, D D', at a speed sufficient to allow the stuff to be thoroughly cleansed while passing from D to D'. While the stuff is passing from one drum to the other many fine jets of water from the roses J J J are impelled against it in a direction somewhat out of the perpendicular to the sieves. When each sieve arrives at D', the pulp contained in it is thoroughly cleansed, and as it passes around the drum the greater portion of it falls. The remainder is washed from it by jets of water from a pipe, N, into the pulp-vat o, from whence it is passed to the reservoir for the Fourdrinier machine or other apparatus for the manufacture of paper. The roses above the sieves we have found to be best constructed with apertures for the jets in the form of very thin slits, similar to those in bat-wing gas-burners. These roses are placed about two inches above the surface of the stuff as it lies upon the sieves. They are represented in the drawing hereto annexed as being some distance above the sieves, in order to show the construction of the latter. The waste water passing through the sieves falls into the vat L, whence it may be conducted to a save-all and allowed to settle, and the settlings may be utilized in the manufacture of brown wrapping-paper. The water used for washing should enter the roses with a good head or pressure in order to work efficiently. No bleaching is necessary in the above process.

To apply the above process to rag-stuff, the rags should be macerated and comminuted before they are cleansed from dust. The dust is separated from the stuff by the above process, and much of the fiber which has hitherto been usually wasted is saved. The stuff is afterward bleached, as may be found necessary, and is made upon the ordinary machine.

What we claim as our invention, and desire to secure by Letters Patent, is—

1. The application of jets of water forcibly impelled against the stuff produced from refuse newspapers and waste paper, in the manner hereinbefore described, for the purpose of separating from said stuff the coloring-matters and carbonaceous particles of ink and other fine impurities and retaining the fibrous pulp on sieves, whether the latter be rectangular, circular, arranged as an endless band, or in any other form whatsoever, and whether the same be made of wire-gauze or muslin or any other textile fabric.

2. The application of the above process, substantially as set forth, for the removal of dust and other like fine impurities from rag-stuffs and other fibrous stuffs used in the manufacture of paper.

SAML. LENHER.
H. H. SPENCER.

Witnesses:
A. SPENCER,
M. T. WIFT.